United States Patent
Martinez et al.

(10) Patent No.: US 10,343,168 B2
(45) Date of Patent: Jul. 9, 2019

(54) REAGENT-LOADED PENCILS AND METHODS

(71) Applicant: Cal Poly Corporation, San Luis Obispo, CA (US)

(72) Inventors: Andres W. Martinez, Pismo Beach, CA (US); Haydn T. Mitchell, Hanover, NH (US); Chad E. Immoos, San Luis Obispo, CA (US); Nathaniel W. Martinez, Arroyo Grande, CA (US); Philip J. Costanzo, San Luis Obispo, CA (US); Samantha J. Carlton, Ventura, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 353 days.

(21) Appl. No.: 14/839,661

(22) Filed: Aug. 28, 2015

(65) Prior Publication Data

US 2016/0059235 A1    Mar. 3, 2016

Related U.S. Application Data

(60) Provisional application No. 62/043,735, filed on Aug. 29, 2014.

(51) Int. Cl.
*B01L 3/00* (2006.01)
*B29C 43/18* (2006.01)
(Continued)

(52) U.S. Cl.
CPC .............. *B01L 3/52* (2013.01); *B29C 43/184* (2013.01); *B43K 19/16* (2013.01); *B01L 2200/087* (2013.01); *B01L 2300/069* (2013.01); *B29K 2071/00* (2013.01); *B29K 2507/04* (2013.01); *B29L 2031/7254* (2013.01)

(58) Field of Classification Search
CPC ........ B43K 19/02; B43K 19/06; B43K 19/08; B43K 19/12; B43K 19/14; B43K 19/18; C09D 13/00; C09D 11/16; C09D 11/18; C09D 11/20
See application file for complete search history.

(56) References Cited

U.S. PATENT DOCUMENTS

2,049,110 A     7/1936  Antonin
4,435,674 A *   3/1984  Hevenor ................ G06K 15/22
                                                          318/640
(Continued)

*Primary Examiner* — Brian R Gordon
(74) *Attorney, Agent, or Firm* — McKee, Voorhees & Sease, PLC (57) ABSTRACT

A reagent-loaded pencil, method of preparing a reagent-loaded pencil, and a system that uses reagent-loaded pencils are disclosed. The reagent-loaded pencil or pencils include a matrix of at least a soluble carrier, a hardening substance, and a reagent. The pencils also include a sheath disposed around at least a portion of the matrix. The soluble carrier may include poly(ethylene glycol) methyl ether. The hardening substance may leave a visible mark when abraded against a writing surface. One example of such a substance includes graphite. The sheath may be the outside of a wooden pencil or a mechanical pencil. A system that uses reagent-loaded pencils or compressed matrices may include a computer-controlled plotter that holds and plots with at least one of the reagent-loaded pencils or matrices.

17 Claims, 4 Drawing Sheets

(51) Int. Cl.
   *B43K 19/16*     (2006.01)
   *B29K 71/00*     (2006.01)
   *B29K 507/04*    (2006.01)
   *B29L 31/00*     (2006.01)

(56) References Cited

U.S. PATENT DOCUMENTS

| | | | |
|---|---|---|---|
| 5,333,005 A * | 7/1994 | Venthem | G01D 15/22 |
| | | | 346/139 B |
| 5,955,112 A | 9/1999 | Kaplan | |
| 6,056,810 A | 5/2000 | Lugert | |
| 6,653,151 B2 | 11/2003 | Anderson | |
| 2003/0041776 A1 * | 3/2003 | Spencer | C09D 11/16 |
| | | | 106/31.65 |
| 2013/0330231 A1 | 12/2013 | Swager | |

\* cited by examiner

REAGENT-LOADED PENCILS AND METHODS

CROSS-REFERENCE TO RELATED APPLICATION

The present application claims benefit of and priority to U.S. Provisional Patent Application Ser. No. 62/043,735 filed on Aug. 29, 2014 entitled "Reagent-Loaded Pencils and Methods," the entire contents of which are hereby incorporated by reference.

BACKGROUND

The present disclosure generally relates to reagants and membrane-based diagnostic tests.

Microfluidic devices, also known as microPADs or µPADS, offer a promising platform for low-cost, easy-to-use, point-of-care diagnostic assays. In many cases, microPADs are small, portable, may function without supporting equipment like pumps, and may require only small volumes of sample and small amounts (~1 µg) of reagents. MicroPADs may be inexpensively made from paper or some other porous membrane or material. Conventional application of reagents onto the devices during fabrication is done via solution-based deposition.

Solution-based deposition of reagents onto microPADs usually involves three basic steps: (i) dissolving the reagent in a liquid solvent to prepare a reagent solution; (ii) adding a small volume of the reagent solution to the device in the desired location; and (iii) drying the device to remove the solvent. Solution-based reagent deposition also is commonly used in the fabrication of a variety of membrane- and plastic-based diagnostic devices, and an entire industry of liquid-dispensing technology has grown around the need for applying small volumes of solutions in specific locations onto porous membranes and other substrates.

One common concern with solution-based deposition is that some reagents do not respond well to the drying process. Enzymes, for example, are important reagents for a variety of point-of-care assays and are known to denature when dried from aqueous solution under ambient conditions. A second common concern with solution-based deposition is that some reagents exhibit relatively short "shelf life" after drying. A third concern with solution-based deposition is that some reagents, including antibodies, bind to porous membranes irreversibly when dried from solution, and for certain types of assays it is desirable for the reagent to still be mobile on the device.

Accordingly, an alternative to solution-based deposition that addresses one or more of these concerns is desired.

SUMMARY

One exemplary embodiment of the disclosed subject matter is a reagent-loaded pencil that includes a matrix of a soluble carrier, a hardening substance, and a reagent. The pencil may also include a sheath disposed around a portion of the matrix.

Another exemplary embodiment of the disclosed subject matter is a method of preparing a reagent-loaded pencil that includes mixing a soluble carrier, a hardening substance, and a reagent into a mixture. The method may also include compressing the mixture into a pellet or shaft and disposing a sheath around a portion of the pellet or shaft.

Yet another exemplary embodiment of the disclosed subject matter is a system for performing assays. The system includes at least a plurality of compressed matrices, each including a soluble carrier, a hardening substance, and a reagent. The system may also include a sheath housing at least a portion of a matrix. One or more of the compressed matrices may include different reagents from at least some other of the compressed matrices. The sheath may be an outside of a wooden pencil or a mechanical pencil capable of holding the compressed matrices. The system may include other elements, for example, a microPAD, a computer-controlled plotter that holds and plots with at least one reagent-loaded pencil or matrix, or both.

In the foregoing exemplary embodiments, the soluble carrier may include poly(ethylene glycol) methyl ether (PEGME) or polyethylene glycol (PEG). Moreover, the hardening substance may be designed to leave a visible mark when abraded against a writing surface. One example of such a substance includes graphite.

BRIEF DESCRIPTION OF THE DRAWINGS

Some non-limiting exemplary embodiments of the disclosed subject matter are illustrated in the following drawings. Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described. Dimensions of components and features shown in the figures are chosen for convenience or clarity of presentation. For convenience or clarity, some elements or structures are not shown or shown only partially and/or with different perspective or from different point of views.

DETAILED DESCRIPTION

A general problem in the field of microPAD assays involves preparation of the microPADs. Reagents are typically loaded onto the microPADs during fabrication via solution-based deposition. This loading process usually involves three basic steps: (i) dissolving the reagent in a liquid solvent to prepare a reagent solution; (ii) adding a small volume of the reagent solution to the device in the desired location; and (iii) drying the device to remove the solvent. Solution-based reagent deposition also is commonly used in the fabrication of a variety of membrane- and plastic-based diagnostic devices, and an entire industry of liquid-dispensing technology has grown around the need for applying small volumes of solutions in specific locations onto porous membranes and other substrates.

One common concern with solution-based deposition is that some reagents do not respond well to the drying process. Enzymes, for example, are important reagents for a variety of point-of-care assays and are known to denature when dried from aqueous solution under ambient conditions. Another common concern with solution-based deposition is that some reagents exhibit relatively short "shelf life" after drying. A third concern is that certain reagents, including antibodies, bind to the device irreversibly when deposited via solution.

Potential benefits of the general and technical solutions provided by the disclosed subject matter include alleviating concerns related to the drying process involved in solution-based deposition of reagents on microPADs, improving shelf life for the reagents, both before and after use in preparing microPADs, and allowing for reagents to be deposited on devices while still being mobile on the device when dissolved in a liquid phase. According to aspects of the subject technology, reagents for assays may be included in a matrix that is in turn included in a pencil or used by a plotter. The pencil or plotter may then be used to draw on microPADs to deposit the reagents. The pencil or plotter may also have other applications.

A general nonlimiting overview of practicing the present disclosure is presented below. The overview outlines exemplary practice of embodiments of the present disclosure, providing a constructive basis for variant and/or alternative and/or divergent embodiments, some of which are subsequently described.

Figure 1:
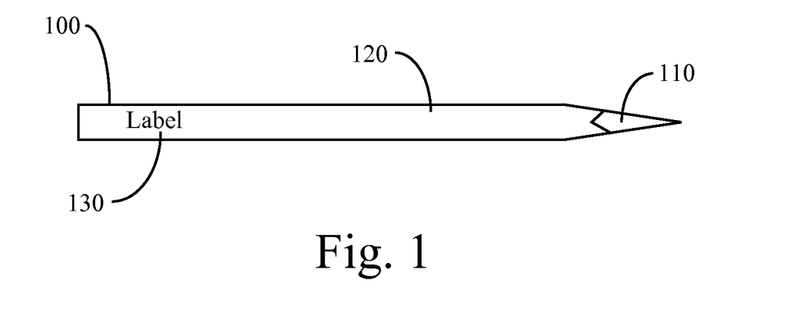
FIG. 1 is a view of a wooden reagent-loaded pencil illustrating an embodiment of the inventions disclosed herein.

FIG. 1 is a view of a wooden reagent-loaded pencil illustrating an embodiment of the inventions disclosed herein. Pencil 100 includes matrix 110. The matrix includes at least a soluble carrier, a hardening substance, and a reagent. The soluble carrier may be water soluble or soluble in some other liquid. In some instances, the carrier may also be insoluble in certain defined substances, for example an oil-soluble/water-insoluble carrier.

In some aspects, the soluble carrier may be or may include poly(ethylene glycol) methyl ether (PEGME). PEGME is a candidate for the carrier due to PEGME's biocompatibility, water solubility, and compressibility.

Compressed matrices that are made from PEGME may be too soft for use as a pencil core. Accordingly, matrix 110 in FIG. 1 also includes a hardening substance such as graphite. In this disclosure, the term "graphite" may be interpreted to include various forms of carbon structures. Examples include but are not limited to "plain" graphite (e.g., powder), graphite nanotubes, graphene sheets, and buckyballs. Because graphite leaves a visible mark when abraded against a writing surface such as paper and many other porous materials, use of graphite may have the added benefit of permitting a person to see where he or she has deposited a reagent when preparing a microPAD. Some reagents interact with carbon. Therefore, some concerns may arise that the graphite may interact with a reagent. Such interaction beyond some buffering was not observed during experimentation.

A mixture of 75% PEGME and 25% graphite by mass was experimentally determined to exhibit good deposition and visibility characteristics that generally were retained even when significant reagents were added. For example, these characteristics where maintained when 0.5% to 15% by mass of erioglaucine disodium salt (blue dye, m.w. 793 g/mol) was added as a model reagent. The subject technology is not limited to a 75% carrier and 25% hardening substance. Furthermore, the subject technology is not limited to use of PEGME or graphite.

Possible alternatives to using PEGME according to aspects of the subject technology include but are not limited to polyethylene glycol (PEG). One possible advantage of using PEG is that the material is generally available in a greater variety of sizes (i.e., molar mass (Mn)) than PEGME. In other aspects, different carriers may be used and/or a combination of carriers may be used (e.g., a combination of PEGME and PEG).

The amount of material deposited by pencils according to aspects of the subject technology onto a surface may be controlled by controlling the hardness of the matrix material used as a pencil core. Harder pencil cores deposit less material. Harder pencil cores can be made by using polymers with higher number average Mn. Polymers with different Mn can also be blended to produce pencil cores with a desired hardness.

In some aspects, a carrier with a sufficiently high Mn, for example PEG with a Mn >2000, may be used in the matrix without a hardening substance. A reagent-loaded pencil that does not contain a hardening substance such as graphite may be particularly useful if the hardening substance might interfere with the operation of the reagent(s).

Additional materials may be used in the matrix, either in addition to or instead of the carrier and/or the hardening substance. One example of such a material is a plasticizer, which when used with a hardening substance may help form a softer matrix that still writes well. Examples of other materials that may be used include but are not limited to polymers and some small molecule substances with high melting points.

In some aspects of the subject technology, materials that covalently link with the reagent may be used for the carrier. Application of energy such as heat or UV light may then be used to release the reagent after deposition on a microPAD via writing. Before the application of the energy, the covalent link may inhibit other substances from reacting with the reagent, which in turn may lead to improved shelf-life. Application of energy may also be used in the absence of a covalently linked carrier in order to trigger certain or faster reactions.

Multiple reagents may be included in the matrix. The matrix may also be formed with different reagents on different sides. The reagent-loaded pencil may also include separate compartments for storage of different matrices that may be used to deposit reagents simultaneously, for example akin to a multi-colored pencil. Other variations are possible.

The reagent may be or include biologically active substances. Examples given above include one or more enzymes and/or antibodies. One enzyme that has been tested is horseradish peroxidase. The reagent was found to be stable in the reagent pencil for over a year when stored at room temperature.

Proteins are another example of a biologically active substance that may be incorporated into reagent-loaded pencils according to aspects of the subject technology. Other materials such as nanoparticles may also be included in some aspects. One protein that has been tested is streptavidin linked to a gold nanoparticle. The streptavidin was deposited on a paper device and could bind to its target, biotin, indicating it had retained its 3D shape.

Antibodies are yet another example of a biologically active substance that may be incorporated into reagent-loaded pencils according to aspects of the subject technology. Examples of antibodies that have been tested include antibodies (IgG), enzyme-linked antibodies, gold nanoparticle-linked antibodies, and antibodies bound to latex polystyrene particles. The last example is a reagent often used in take home pregnancy tests.

In some aspects, a reagent-loaded pencil that includes one or more antibodies (or other biologically active substances) may facilitate use of simpler materials for other parts of a test. For example, most lateral flow immunoassays (e.g., the take home pregnancy test) are made of four layers of porous material: (1) a sample pad, (2) a conjugate pad, (3) a nitrocellulose strip and (4) an absorbent waste pad. Labeled antibodies are typically dried on the conjugate pad, which is usually made of a special glass fiber. The conjugate pad is typically designed so the antibodies can dissolve into the sample solution (e.g., urine) when the device is used and then move across the nitrocellulose strip. One reason the conjugate pad is typically made of a special glass fiber is that antibodies dried on nitrocellulose or paper tend to stick and are no longer mobile.

In contrast, a reagent-loaded pencil that includes antibodies according to aspects of the subject technology can be used to apply the antibodies directly to a nitrocellulose or paper strip. In at least some tests, the antibodies were found to retain sufficient mobility that use of glass finer was no longer necessary. Thus, tests using those antibodies could be performed using immunoassays that did not include the conjugate pad and associated special glass. These immunoassays are likely to be simpler to manufacture, less expensive, and easier to store than those that include the special glass.

Other possible biologically active substances that may be included in a reagent-loaded pencil according to aspects of the subject technology include but are not limited to DNA, RNA, phage, cells, yeast, bacteria and/or viruses.

Returning to FIG. 1, sheath 120 in that figure takes the form of an outside of a wooden pencil and the matrix 110 including a reagent disposed as a core of the wooden pencil. Label 130 may be provided to identify the particular reagent included in pencil 100. Wooden pencils are inexpensive to mass produce. Thus, wooden reagent-loaded pencils such as shown in FIG. 1 may be particularly suited for in-field use in impoverished areas, although pencil 100 is not limited to such use.

Other types of material may be used for the sheath. For example, the sheath may be made of paper (e.g., akin to a crayon) or plastic.

Figure 2:
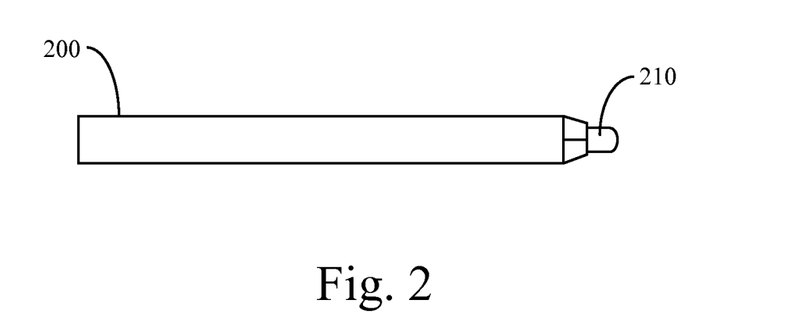
FIG. 2 is a view of a mechanical reagent-loaded pencil illustrating an embodiment of the inventions disclosed herein.

FIG. 2 is a view of a mechanical reagent-loaded pencil illustrating an embodiment of the inventions disclosed herein. Pencil 200 is shown as a mechanical pencil that may hold a matrix pellet 210 in its tip. This pellet generally may be made of the same materials as discussed above with respect to matrix 110 in FIG. 1. In use, different pellets that include different reagents may be swapped out of pencil 200.

Figure 3:
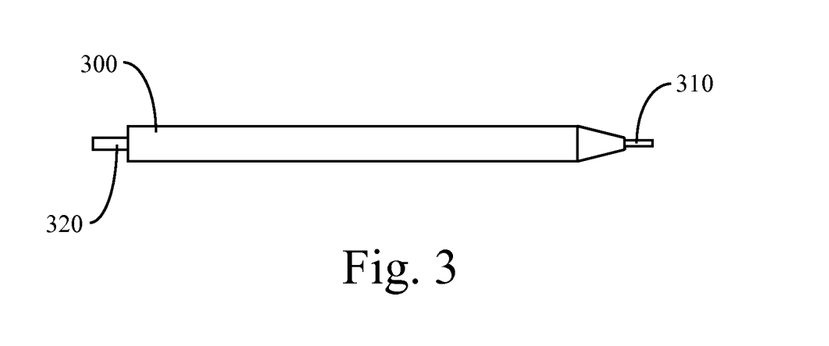
FIG. 3 is a view of another mechanical reagent-loaded pencil illustrating an embodiment of the inventions disclosed herein.

FIG. 3 is a view of another mechanical reagent-loaded pencil illustrating an embodiment of the inventions disclosed herein. Pencil 300 is shown as a mechanical pencil that may hold a matrix shaft 310. This shaft generally may be made of the same materials as discussed above with respect to matrix 110 in FIG. 1. In use, depressing button 320 may eject more of the shaft out of pencil 300, and different shafts that include different reagents may be swapped out of pencil 300.

Figure 4:
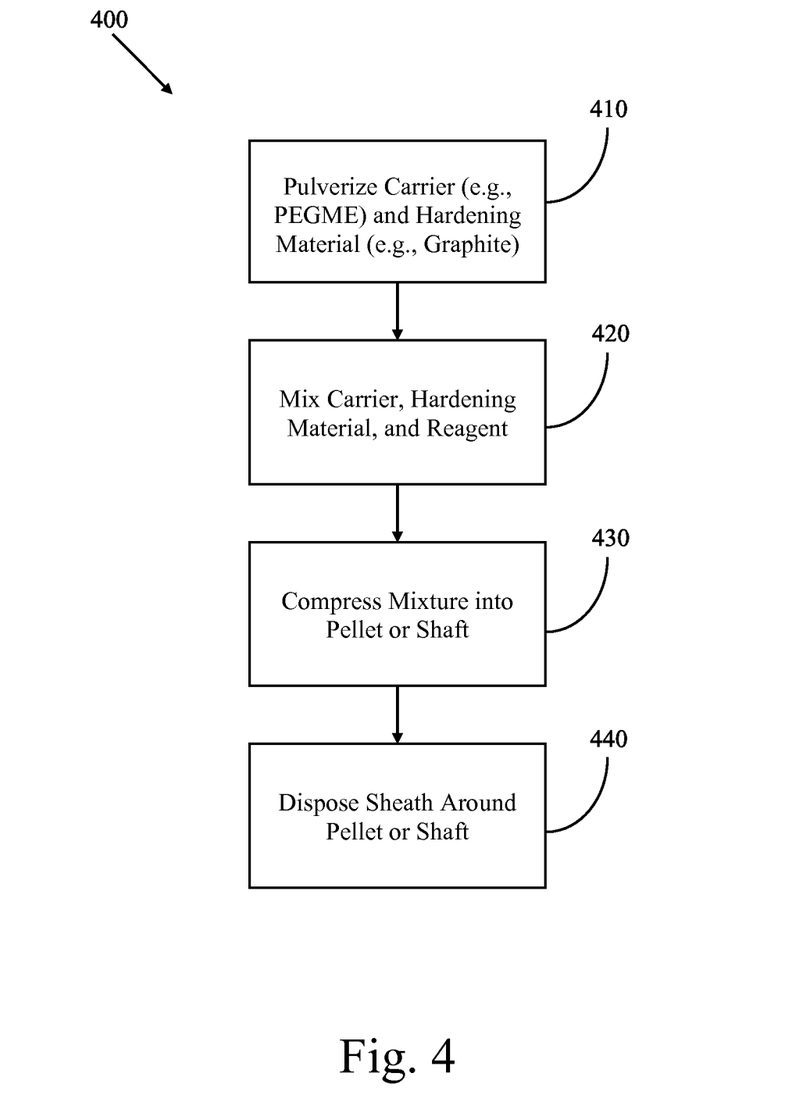
FIG. 4 is a flow diagram illustrating an example process of preparing a reagent-loaded pencil according to an embodiment of the inventions disclosed herein.

FIG. 4 is a flow diagram illustrating an example process 400 of preparing a reagent-loaded pencil according to an embodiment of the inventions disclosed herein. In step 410, a soluble carrier such as PEGME and a hardening substance such as graphite are pulverized. For example, a selected proportion of the carrier and the hardening substance may be placed in a crucible and mechanically pulverized. Alternatively, a pre-pulverized carrier and a pre-pulverized hardening substance may be acquired. The pulverized carrier and hardening substance are mixed with at least one reagent in step 420.

Other operations besides those illustrated by steps 410 and 420 may be performed to achieve a mixture of carrier, hardening substance, and reagent(s). For example, a pre-made mixture may be acquired from a manufacturer.

The mixture is compressed in step 430. For a PEGME/graphite/reagent matrix, compression with 5 tons of force using a 6.35 mm die was found to create a compressed matrix that could be loaded into a mechanical pencil and used to deposit reagent on a microPAD. The subject technology is not limited to this level of force, size of die, or compression technique.

A matrix may be formed in other ways than illustrated in FIG. 4. For example, a soluble carrier and a reagent may be dissolved in a solvent. Graphite or some other hardening substance may be added to form a slurry. The slurry may then be dried, for example using a rotovap or a lyophilizer. This technique may result in a more uniform dispersal of the reagent in the matrix, which then may be used as a pencil core.

Figure 5:
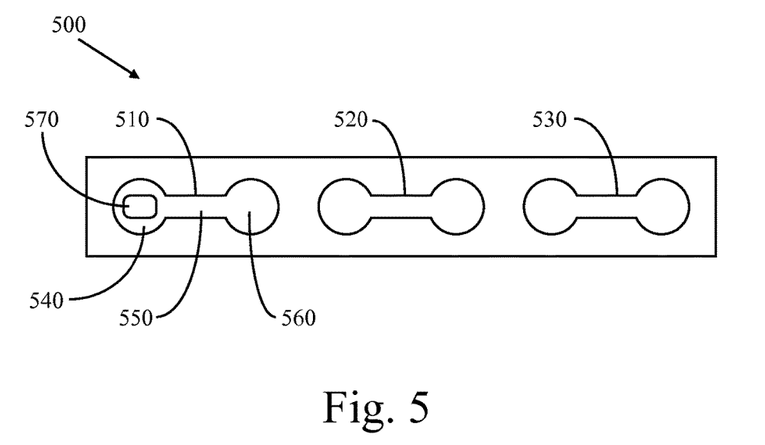
FIG. 5 is a view of a microPAD marked with a reagent-loaded pencil illustrating an embodiment of the inventions disclosed herein.

FIG. 5 is a view of a microPAD marked with a reagent-loaded pencil illustrating an embodiment of the inventions disclosed herein. MicroPad strip 500 includes three microPAD test areas 510, 520, and 530. Each test area includes sample zone 540, channel 550, and test zone 560. In FIG. 5, reagent 570 has been deposited in sample zone 540 of test area 510 using a reagent-loaded pencil according to aspects of the subject technology.

Once deposited on the microPAD test area, the reagent(s) may be dissolved into a sample solution and transported to a new area on the device via capillary wicking The transported reagent(s) may then participate in a chemical reaction or some other type of interaction (e.g. antibody-antigen interaction). In some uses, multiple reagents may be applied, either before transportation and chemical reaction or in a series of application/transportation/reaction steps.

In some aspects of the subject technology, the amount of reagent that is deposited on a device may be controlled in numerous ways. Some examples include but are not limited to the following:
(i) controlling the amount of reagent in the pencil,
(ii) controlling the area on the device over which the pencil is deposited, and
(iii) controlling the force with which the pencil is applied (e.g., more force deposits more reagent).

The second and third of these examples may permit a person using one reagent-loaded pencil to prepare a multi-point calibration curve.

Deposition of a reagent using a reagent-loaded pencil in sample zone 540 or channel 550 may result in a better signal-to-noise ratio than deposition in test zone 560. One possible reason for the better signal-to-noise ratio is that some or all of the hardening substance used to draw the reagent may be filtered out by some or all of channel 550, reducing the buffering action of the hardening substance.

The subject technology is not limited to the particular microPADs test areas illustrated in FIG. 5. Other microPADs having different layouts, possibly having more than one sample zone, channel, and/or test zone, formed from multiple layers of stacked porous materials, or structured in other ways may be used.

At least some microPADs produced using the subject technology have been found to have a longer shelf life than microPADs produced using solution-based deposition. Furthermore, use of reagent-loaded pencils according to the subject technology generally avoids concerns related to degradation of some reagents while drying after solution-based deposition. Use of a hardening material that creates a visual indication when abraded against a writing material also may enhance control over where and how much reagent is applied while producing microPADs.

Figure 6:
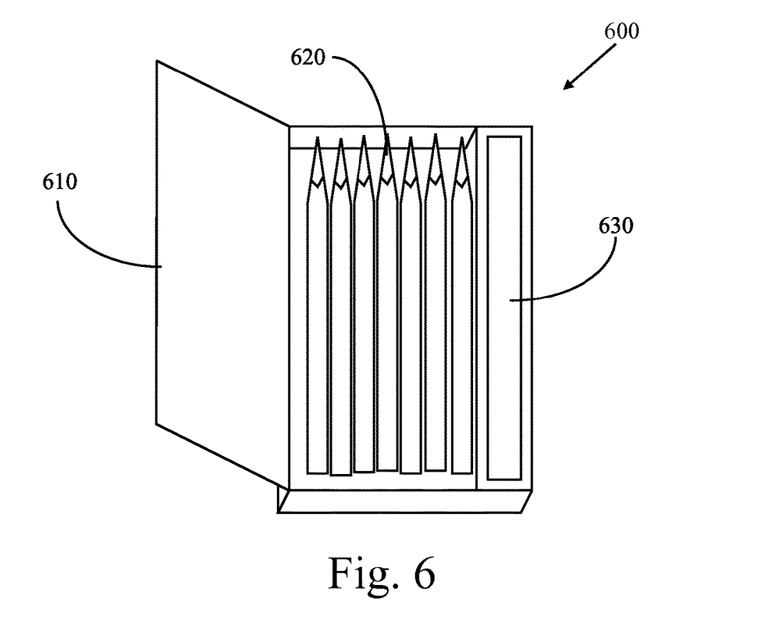
FIG. 6 is a view of a system including a kit illustrating an embodiment of the inventions disclosed herein.

FIG. 6 is a view of a system including a kit 600 illustrating an embodiment of the inventions disclosed herein. Case 610 of kit 600 holds wooden sheathed reagent-loaded pencils 620, for example of the type discussed with respect to FIG. 1. Pencils that are loaded with various different reagents may be included in the kit. Thus, kit 600 is intended to enable in-field and/or on-demand preparation of various microPADs.

The illustrated kit also includes storage area 630, for example to hold blank microPAD sheets. In some aspects, area 630 may be omitted and the sheets may be stored separately. Case 610 preferably is suitably durable and environmentally resistant to protect any stored reagent-loaded pencils and other materials.

Figure 7:
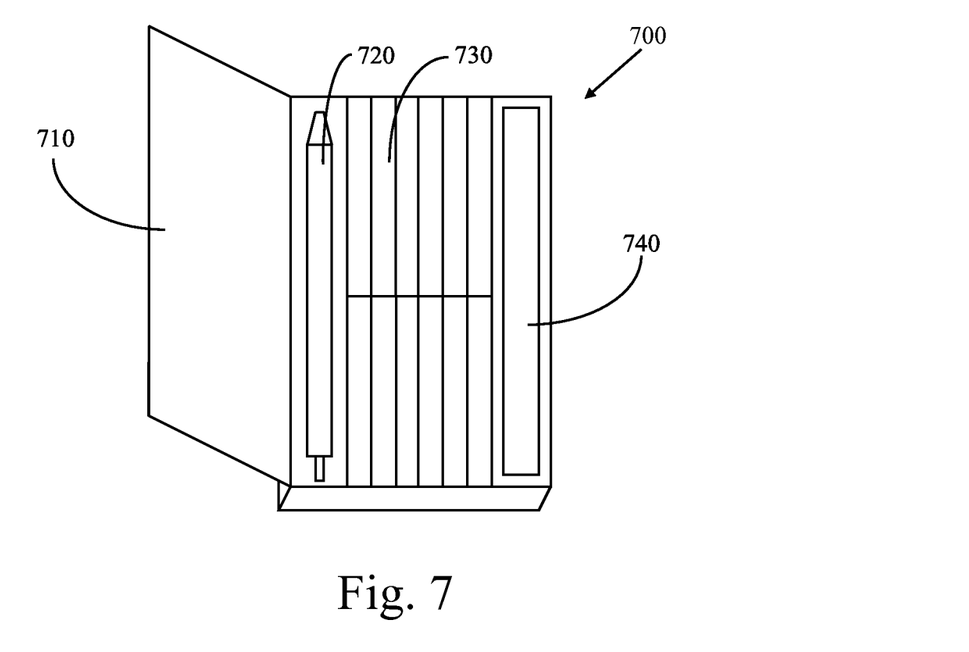
FIG. 7 is a view of a system including another kit illustrating an embodiment of the inventions disclosed herein.

FIG. 7 is a view of a system including another kit 700 illustrating an embodiment of the inventions disclosed herein. Case 710 of kit 700 holds mechanical pencil 720, for example of the type discussed with respect to FIG. 2 or FIG. 3. One or more extra mechanical pencils may also be included.

Storage areas 730 hold pellets or shafts formed of compressed matrices including reagents that may be used with mechanical pencil 720. Different storage areas may hold pellets or shafts that include different reagents. Thus, kit 700 also is intended to enable in-field and/or on-demand preparation of various microPADs.

The illustrated kit also includes storage area 740, for example to hold blank microPAD sheets. In some aspects, area 740 may be omitted and the sheets may be stored separately. Case 710 preferably is suitably durable and environmentally resistant to protect any stored pellets or shafts, as well as any other stored materials.

In both FIG. 6 and FIG. 7, reagents may be protected from environmental degradation both by being locked in a matrix and by a durable case. In contrast, when in the field, reagent in solution may be susceptible to such degradation. For example, a bottle holding reagent in solution may break, and the reagent may be lost. For another example, reagent in solution may be more susceptible to changes in temperature and humidity. Thus, the subject technology provides significant benefits for in-field use.

Figure 8:
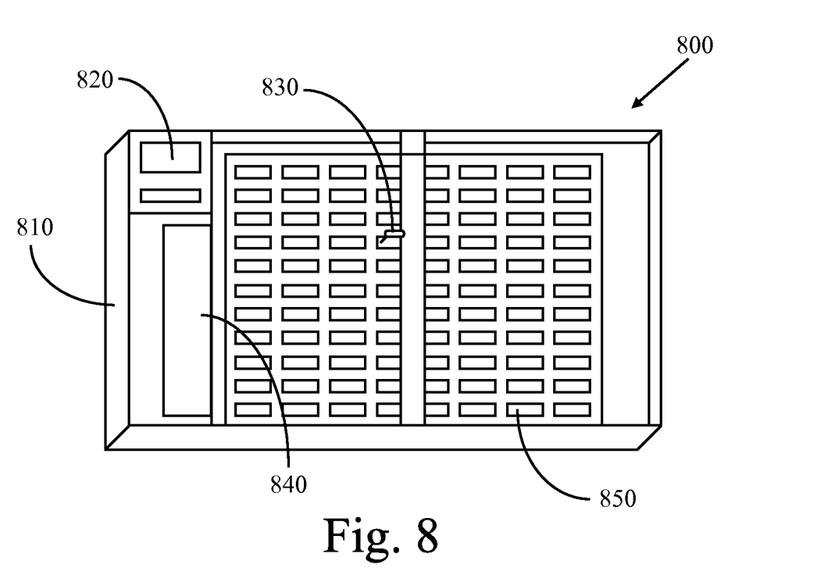
FIG. 8 is a view of a system including a plotter illustrating an embodiment of the inventions disclosed herein.

FIG. 8 is a view of a system 800 including a plotter 810 illustrating an embodiment of the inventions disclosed herein. Control panel 820 is shown to illustrate that plotter 810 may be computer-controlled. The control may move pencil or matrix holder 830 around the plotter. A variety of reagent-loaded pencils according to the subject technology may be stored in area 840. Alternatively, a variety of compressed matrices including reagents in the form of pellets, shafts, or some other form factor may be stored in area 840. Holder 830 may grasp various ones of these pencils or matrices and draw on microPAD sheet 850 under the command of the computer control. Thus, system 800 may permit customized creation of a large number of microPADs using a relatively compact plotter, for example to run a large number of tests to identify an unknown illness.

While certain embodiments have been described, the embodiments have been presented by way of example only and are not intended to limit the scope of the inventions. Indeed, the novel devices and methods described herein may be embodied in a variety of other forms; furthermore, various omissions, substitutions, and changes in the form of the devices and methods described herein may be made without departing from the spirit of the inventions. The accompanying claims and their equivalents are intended to cover such forms or modifications as would fall within the scope and spirit of the inventions.

What is claimed is:

1. A reagent-loaded pencil, comprising:
   a) a composition comprising:
      (i) at least one soluble carrier; and
      (ii) at least one reagent, said at least one reagent comprising a biologically active substance capable of reacting with a sample, said biologically active substance selected from the group consisting of enzymes, proteins, DNA, RNA, phage, cells, yeast, bacteria, viruses, and antibodies; and
   b) a sheath disposed around at least a portion of the composition.

2. The reagent-loaded pencil of claim 1, wherein the soluble carrier comprises poly(ethylene glycol) methyl ether (PEGME).

3. The reagent-loaded pencil of claim 1 wherein said composition further comprises graphite.

4. The reagent-loaded pencil of claim 3, wherein said composition comprises a mixture of said soluble carrier and said graphite, said mixture comprising a mixture of 75% soluble carrier comprising poly(ethylene glycol) methyl ether (PEGME) and 25% graphite.

5. The reagent-loaded pencil of claim 1, wherein said soluble carrier comprises polyethylene glycol (PEG).

6. The reagent-loaded pencil of claim 2, wherein said composition further comprises graphite.

7. The reagent-loaded pencil of claim 5, wherein said polyethylene glycol (PEG) has a molar mass (Mn) of greater than 2000.

8. The reagent-loaded pencil of claim 1, comprising a plurality of said composition.

9. The reagent-loaded pencil of claim 1, wherein said composition does not include graphite.

10. A method of preparing a reagent-loaded pencil, comprising:
    mixing a soluble carrier and at least one reagent, said at least one reagent comprising a biologically active substance capable of reacting with a sample, said biologically active substance selected from the group consisting of enzymes, proteins, DNA, RNA, phage, cells, yeast, bacteria, viruses, and antibodies to produce a composition;
    compressing the composition into a pellet or shaft; and
    disposing a sheath around at least a portion of the pellet or shaft to produce said reagent-loaded pencil.

11. The method of claim 10, wherein the soluble carrier comprises poly(ethylene glycol) methyl ether or polyethylene glycol.

12. The method of claim 10, further comprising mixing graphite in said composition.

13. A system for performing assays, comprising:
a reagent-loaded pencil having a plurality of matrices, each matrix comprising a composition comprising:
   (i) a soluble carrier;
   (ii) at least one reagent, said at least one reagent comprising a biologically active substance capable of reacting with a sample, said biologically active substance selected from the group consisting of enzymes, proteins, DNA, RNA, phage, cells, yeast, bacteria, viruses, and antibodies;
   (iii) graphite; and
   (iv) a sheath disposed around at least a portion of the composition.

14. The system of claim 13, wherein the soluble carrier of the reagent-loaded pencil comprises poly(ethylene glycol) methyl ether.

15. The system of claim 13, wherein said soluble carrier comprises poly(ethylene glycol) methyl ether or polyethylene glycol.

16. The system of claim 13, wherein no two matrices include the same reagent.

17. The system of claim 13, further comprising a microPAD.

\* \* \* \* \*